United States Patent
Furlani et al.

[11] Patent Number: 5,840,134
[45] Date of Patent: Nov. 24, 1998

[54] FUNCTIONALLY GRADIENT PERMANENT MAGNET ACTUATORS

[75] Inventors: Edward Paul Furlani, Lancaster; Syamal Kumar Ghosh; Dilip Kumar Chatterjee, both of Rochester, all of N.Y.

[73] Assignee: Eastman Kodak Company, Rochester, N.Y.

[21] Appl. No.: 883,057

[22] Filed: Jun. 26, 1997

Related U.S. Application Data

[62] Division of Ser. No. 720,402, Sep. 30, 1996, Pat. No. 5,716,461.

[51] Int. Cl.⁶ .................................................. H01F 1/057
[52] U.S. Cl. .......................... 148/302; 428/610; 428/614; 335/281; 335/296
[58] Field of Search .................................... 428/610, 611, 428/614, 928; 148/302; 335/281, 296

[56] References Cited

U.S. PATENT DOCUMENTS

| | | | |
|---|---|---|---|
| 3,885,017 | 5/1975 | Schuler | 148/105 |
| 4,407,578 | 10/1983 | Petersen . | |
| 4,770,702 | 9/1988 | Ishigaki et al. | 148/302 |
| 5,295,031 | 3/1994 | Wasson . | |
| 5,464,670 | 11/1995 | Ikuma et al. . | |

*Primary Examiner*—John Sheehan
*Attorney, Agent, or Firm*—Edward Dugas

[57] ABSTRACT

A functionally gradient permanent magnet is formed as a slab of alloy comprised of a rare earth-transition metal-boron, and areas of a diffused transition metal positioned at points along the length of at least one surface of the slab of alloy.

6 Claims, 2 Drawing Sheets

FUNCTIONALLY GRADIENT PERMANENT MAGNET ACTUATORS

This is a Divisional of application Ser. No. 08/720,402, filed 30 Sep. 1996 now U.S. Pat. No. 5,716,461.

FIELD OF THE INVENTION

The invention relates generally to the field of permanent magnet fabrication, and in particular to a magnet that is uniquely fabricated to have a functionally gradient magnetic field.

BACKGROUND OF THE INVENTION

Conventional permanent magnet actuators use uniformly polarized permanent magnets as a field source for implementing motion of current energized conductors. A significant problem with these actuators is that the conductors are energized with a functionally varying current which necessitates sensing and feedback i.e., a closed-loop configuration, to obtain a desired motion profile and response. In conventional actuators the current is varied and the field (produced by the magnet) is uniform. This, in turn, requires complicated and expensive feedback mechanisms and control circuitry for generating that varying current. The subject of this invention is a novel approach to actuator fabrication in which the permanent magnet is fabricated with functionally gradient magnetic properties. That is, the intrinsic M-H loop of the material varies in a predefined fashion along a given length of the magnet. Once fabricated, the magnet can be polarized in a uniform external field to produce a predefined polarization profile along a given length. This, in turn, results in a spatially varying magnetic field profile outside the magnet. When a conductor with a fixed current flowing therein passes through the magnet's field it experiences a spatially varying Lorentz force which gives rise to a specific motion profile. Thus, a predefined motion profile can be obtained without the need for complicated drive circuitry and feedback.

SUMMARY OF THE INVENTION

The present invention is directed to overcoming one or more of the problems set forth above. Briefly summarized, according to one aspect of the present invention a functionally gradient permanent magnet is comprised of:

a slab of alloy comprised of a rare-earth-transition metal-boron; and areas of diffused transition metal positioned at points along the length of at least one surface of said slab of alloy.

These and other aspects, objects, features, and advantages of the present invention will be more clearly understood and appreciated from a review of the following detailed description of the preferred embodiments and appended claims, and by reference to the accompanying drawings.

Advantageous Effect Of The Invention

The present inventive magnets have the following advantages:

1. They enable the use of inexpensive drive circuitry;
2. They eliminate the need for expensive feedback sensors and circuitry.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1A:
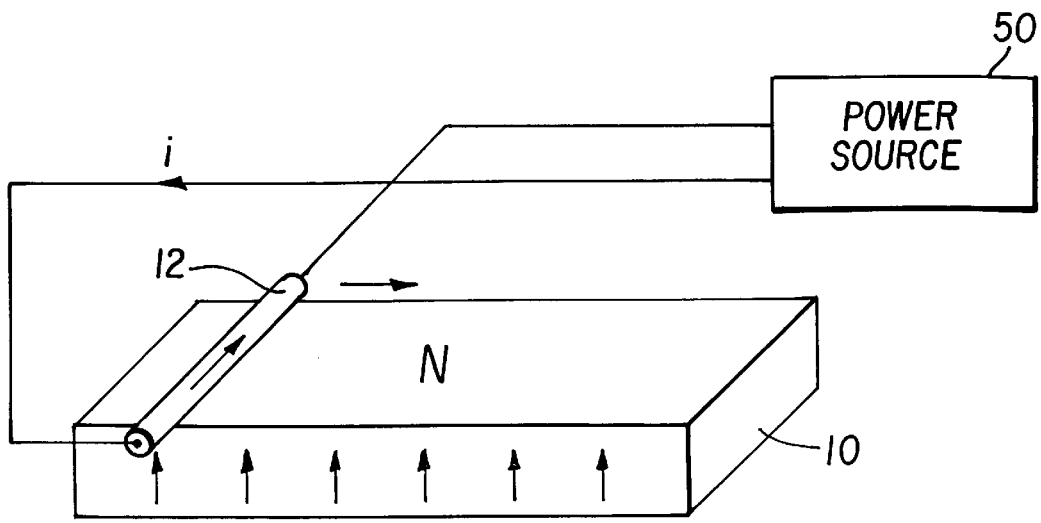
FIGS. 1A and 1B illustrate in a simplified perspective view a PRIOR ART permanent magnet and a current element (energized conductor) driven by a power source and a chart illustrating the residual magnetization along the length of the PRIOR ART permanent magnet, respectively.
Figure 1B:
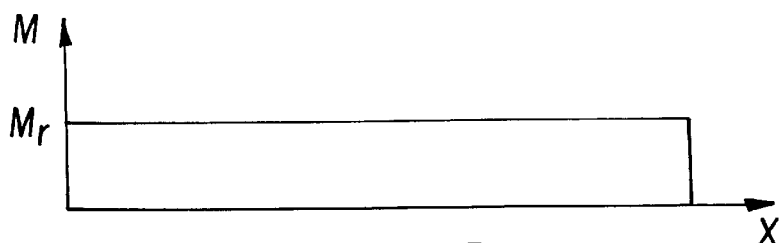

Referring to FIG. 1A, a conventional PRIOR ART permanent magnet 10, is positioned proximate a current element 12 such that a current i supplied by a power source 50 causes the current element 12 to move along the length of the magnet 10. By varying the magnitude of the current i the speed at which the current element moves along the length of the magnet 10 can be controlled. FIG. 1B illustrates that the strength of the residual magnetization along the length of the magnet 10 remains constant.

Figure 2A:
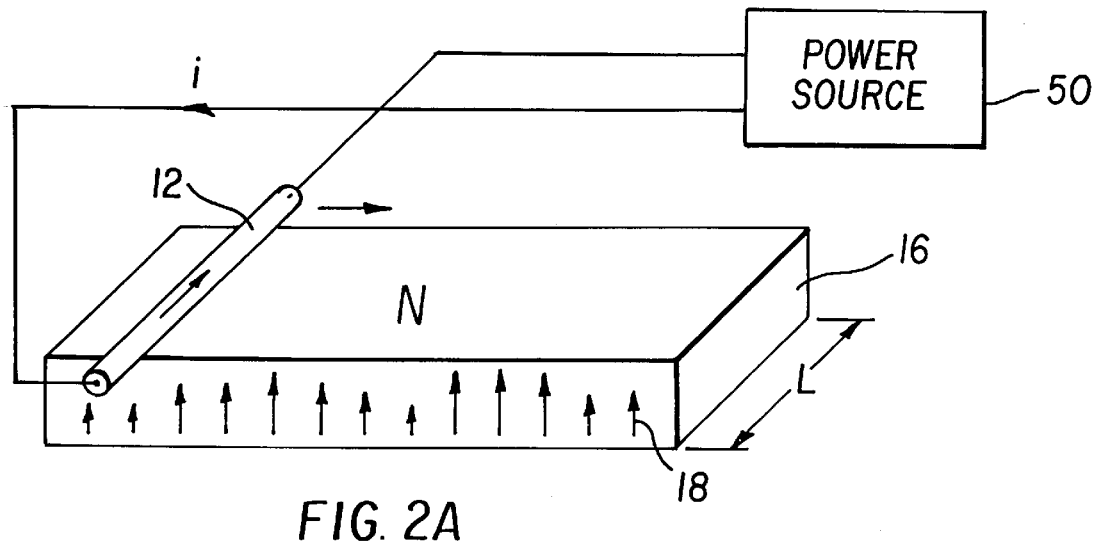
FIGS. 2A, 2B, 2C, and 2D, illustrate in a simplified perspective view a permanent magnet with a functionally gradient residual magnetization and a current element driven by a constant current source, a chart illustrating the residual magnetization along the length of the permanent magnet, an M-H loop, taken at a point along the X-axis of the permanent magnet, and a chart illustrating the vertical field component encountered by the current element along the length of the permanent magnet, respectively.
Figure 2B:
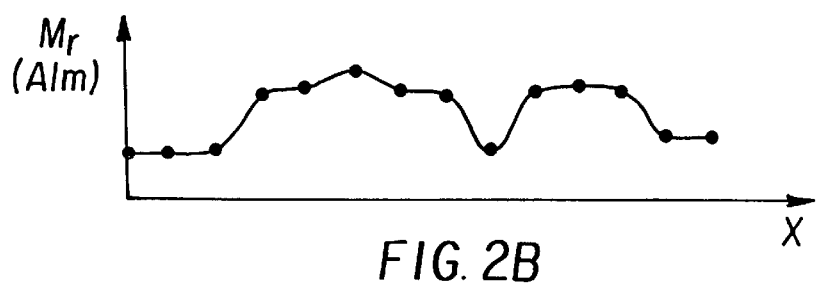
Figure 2C:
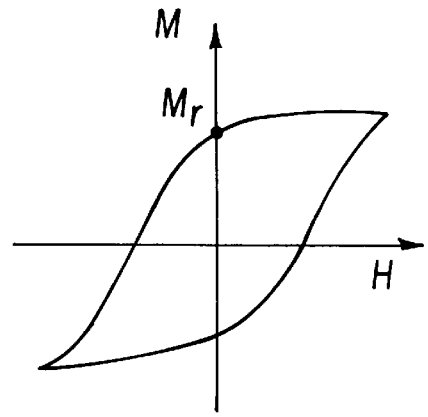
Figure 2D:
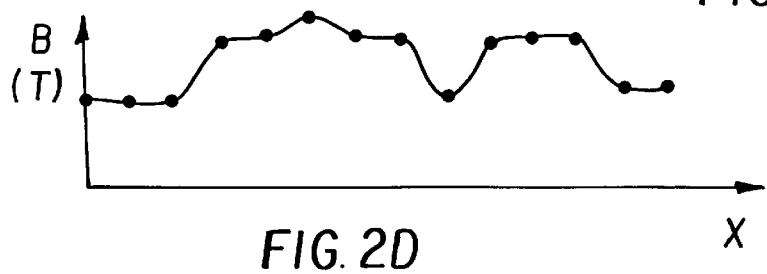

Referring now to FIG. 2A, a permanent magnet 16, is positioned proximate a current element 12 such that a current i supplied by a power source 50 causes the current element 12 to move along the length of the permanent magnet 16. Permanent magnet 16 is provided with a varying residual magnetization amplitude profile, depicted by the different lengths of the vertical arrows 18. FIG. 2B then illustrates the amplitude profile of the residual magnetization $M_r$ along the length of the magnet 16 with the dots corresponding to the values of $M_r$ at the corresponding locations of the vertical arrows 18 of FIG. 2A. FIG. 2C illustrates an M-H loop taken at one point along the length of the magnet 16. FIG. 2D illustrates the magnetic field B encountered by the current element 12 as it moves along the length of the magnet 16.

Figure 3:
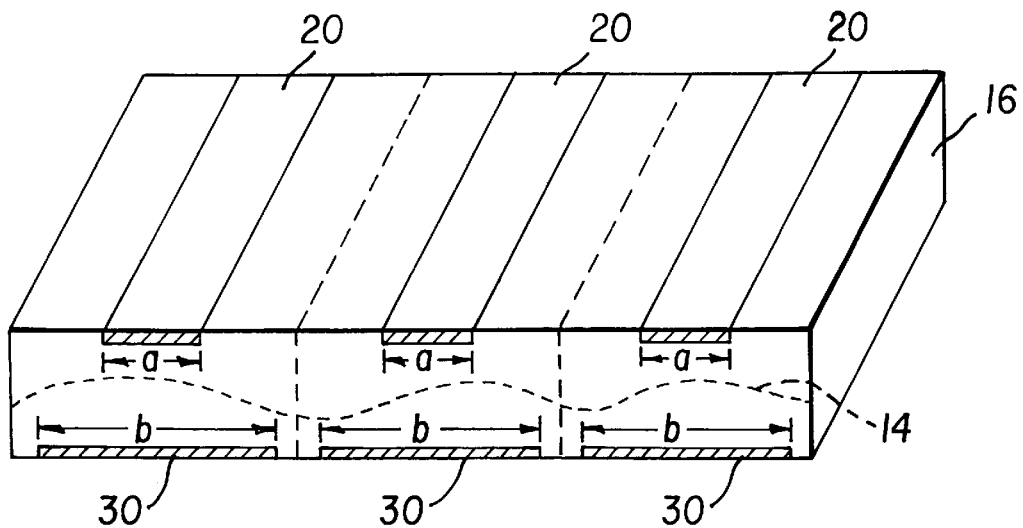
FIG. 3 illustrates, in perspective view, a preferred configuration of a permanent magnet fabricated in accordance with the teachings of the present invention.

Referring now to FIG. 3, a ferro-magnetic slab 16 comprised of a rare earth-transition metal-boron like ternary alloy such as NdFeB or SmCoB etc., is fabricated such that the chemical stoichiometry of the slab varies in a desired fashion along a given length. The fabrication process is as follows: Initially, a ternary NdFeB alloy (alternatively SmCoB alloy or SmFeB alloy etc.) or alternatively a binary NdB alloy or SmB alloy is formed into a desired shape as represented by slab 16. The ternary NdFeB alloy will have uniform magnetic properties whereas the binary NdB alloy will have almost non-existent magnetic properties. The rare earth component of the slab of alloy is selected from the group consisting of Sm, Nd, Pr, Ce, Tb, and Dy. Next, a transition metal selected from the group consisting of Fe, Co, Cu, Zr, and Hf, is placed on one or more surfaces of slab 16 with a varying concentration profile along a given length. FIG. 3 illustrates the slab 16 divided into three equal imaginary segments with the transition element deposited into notches on the top and bottom surfaces. Parallel notches 20, of predetermined width, length, and depth are machined on the top surface of the slab 16, and similarly parallel notches 30 are machined on the bottom side of the slab. Either a solid sheet or powder of the transition element (or a combination of transition elements) is placed in the notches 20 and 30. In the embodiment shown, the width a and b on the top and bottom surfaces of the slab, respectively, are selected so as to render a sinusoidal residual magnetization amplitude profile 14 along the length of the slab 16 as explained below. The notches 20 are strategically placed at the locations where the peak residual magnetization is to reside.

The next step entails the diffusion of the transition metal (one or more than one species) into the bulk of the slab 16. For this, the entire assembly is placed inside an atmosphere controlled oven and heated in the presence of either Ar or $N_2$ gas above 0.5 Tm (melting temperature) of Fe if(alternatively Co, Cu etc.), i.e., between 500° and 700° C. for a length of time. The diffusion of the transition metal is a temperature and time dependent phenomenon. Once the diffusion process is completed and the ferro-magnetic slab 16 is subjected to an external polarization field, the residual magnetization amplitude profile 14 will obtain a sinusoidal pattern along the length of slab 16. The concentration of transition metal in the NdFeB alloy (or alternatively SmCoB or SmFeB etc.) dictates the magnitude of the residual magnetization amplitude upon polarization. As well known in the art, a diffusion path can be devised and a desired residual magnetization profile can be obtained for a given geometry and volume of the slab. Alternatively, the diffusion path of the transition element (or elements) and thus the residual magnetization amplitude profile can be arrived at empirically by performing several experiments and measuring the magnetic field along a given path external to the functionally gradient permanent magnet slab 16, with a Hall probe. The profile can be corrected or modified by varying the experimental parameters. Once those parameters are established for a given magnetic field amplitude profile, that profile can be repeated precisely indefinitely.

The invention has been described with reference to a preferred embodiment; However, it will be appreciated that variations and modifications can be effected by a person of ordinary skill in the art without departing from the scope of the invention.

PARTS LIST:

10 PRIOR ART permanent magnet
12 current element (energized conductor)
14 residual magnetization amplitude profile
16 functionally gradient permanent magnet slab
18 arrows
20 parallel notches
30 parallel notches
50 power source

We claim:

1. A functionally gradient permanent magnet comprising:

a slab of alloy comprising a rare earth-transition metal-boron alloy; and areas of diffused transition metal positioned at points along the length of at least one surface of said slab of alloy.

2. The functionally gradient permanent magnet according to claim 1 wherein the areas of diffused transition metal are bounded by notches formed in said slab of alloy.

3. The functionally gradient permanent magnet according to claim 1 wherein the rare earth component of the slab of alloy is selected from the group consisting of Sm, Nd, Pr, Ce, Tb, and Dy.

4. The functionally gradient permanent magnet according to claim 1 wherein the transition metal is selected from the group consisting of Fe, Cu, Co, Zr, and Hf.

5. The functionally gradient permanent magnet according to claim 3 wherein the transition metal is selected from the group consisting of Fe, Cu, Co, Zr, and Hf.

6. The functionally gradient permanent magnet according to claim 1 wherein the position of the areas of diffused transition metal are a function of the gradient of the permanent magnet.

\* \* \* \* \*